(12) United States Patent
Aoki (10) Patent No.: US 12,231,038 B2
(45) Date of Patent: Feb. 18, 2025

(54) POWER CONVERSION DEVICE (71) Applicant: Mitsubishi Electric Corporation, Tokyo (JP)

(72) Inventor: Wataru Aoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 255 days.

(21) Appl. No.: 17/967,188

(22) Filed: Oct. 17, 2022

(65) Prior Publication Data

US 2023/0179102 A1 Jun. 8, 2023

(30) Foreign Application Priority Data

Dec. 8, 2021 (JP) ................................. 2021-198943

(51) Int. Cl.
| | | |
|---|---|---|
| H02M 3/335 | (2006.01) | |
| H02M 3/00 | (2006.01) | |
| H02M 5/458 | (2006.01) | |
| H02M 7/5395 | (2006.01) | |
| H02M 7/00 | (2006.01) | |

(52) U.S. Cl.
CPC ....... *H02M 3/003* (2021.05); *H02M 3/33573* (2021.05); *H02M 5/4585* (2013.01); *H02M 7/5395* (2013.01); *H02M 7/003* (2013.01)

(58) Field of Classification Search
CPC .... H02M 3/003; H02M 3/335; H02M 3/3373; H02M 7/003
See application file for complete search history.

(56) References Cited

U.S. PATENT DOCUMENTS

| | | | | |
|---|---|---|---|---|
| 2021/0099072 A1* | 4/2021 | Uryu | ..................... | H02M 7/003 |
| 2021/0384834 A1 | 12/2021 | Sugaya et al. | | |
| 2022/0352826 A1* | 11/2022 | Leng | ..................... | H01F 27/255 |

FOREIGN PATENT DOCUMENTS

| | | |
|---|---|---|
| EP | 3 905 500 A1 | 11/2021 |
| JP | WO2020/136886 A1 | 7/2020 |

* cited by examiner

*Primary Examiner* — Gary L Laxton
(74) *Attorney, Agent, or Firm* — Sughrue Mion, PLLC (57) ABSTRACT

A power conversion device includes: a transformer in which power supply to a primary winding by an inverter circuit is performed; a rectifier circuit to rectify alternating voltage generated in a secondary winding of the transformer with rectifier elements; a smoothing reactor to smooth the rectified voltage; a first main circuit line which connects the smoothing reactor and an output end; a second main circuit line which connects the rectifier circuit and the output end; and a smoothing capacitor connected between the first main circuit line and the second main circuit line. An upper surface of the first main circuit line on which the smoothing capacitor is mounted and an upper surface of the second main circuit line on which the smoothing capacitor is mounted are provided on an identical plane. The rectifier element is connected to the upper surface of the second main circuit line.

12 Claims, 5 Drawing Sheets

POWER CONVERSION DEVICE

TECHNICAL FIELD

The present disclosure relates to a power conversion device.

BACKGROUND ART

In Patent Literature 1, a power conversion device for converting a high voltage of a direct current power supply into a low voltage is disclosed.

CITATION LIST

Patent Literature

Patent Literature 1: WO No. 2020/136886

SUMMARY OF INVENTION

Technical Problem

In the power conversion device disclosed in Patent Literature 1, after an alternating voltage from a transformer is rectified by a rectifier element to a pulsating voltage, the rectified pulsating voltage is smoothed by a smoothing capacitor or the like. Electric power is supplied to the transformer by an inverter circuit.

Here, the inverter circuit has multiple switching elements. When switching of these switching elements is performed, a voltage is generated by parasitic inductance. Because this generated voltage is steep, there is a possibility that the voltage becomes a noise source of the power conversion device.

Therefore, in the power conversion device disclosed in Patent Literature 1, in addition to the smoothing capacitor, a separate board, multiple terminals, and terminal fixing components for fixing these terminals are needed in order to suppress noise. As a result, in the power conversion device disclosed in Patent Literature 1, the number of parts is large. Further, in the power conversion device disclosed in Patent Literature 1, multiple mounting processes including mounting of the smoothing capacitor on a board, and fixation of the board on which this smoothing capacitor is mounted to conductors are needed. Further, in the case of attempting to suppress noise, because the value of the parasitic inductance largely depends on the length of the wiring route, it is desirable to shorten the wiring route as much as possible.

The present disclosure is made in order to solve the above-mentioned problems, and it is therefore an object of the present disclosure to provide a power conversion device that makes it possible to shorten the terminals of a smoothing capacitor, and the wiring route from rectifier elements to the smoothing capacitor, thereby suppressing noise, while making it possible to lessen the number of parts and the number of mounting processes.

Solution to Problem

According to the present disclosure, there is provided a power conversion device including: a transformer having a primary winding and a secondary winding, power supply to the primary winding by an inverter circuit being to be performed; a rectifier circuit to rectify alternating voltage generated in the secondary winding with multiple rectifier elements; a smoothing reactor whose first end is connected to a first output terminal of the rectifier circuit, to smooth the voltage rectified by the rectifier circuit; a first main circuit line which connects a second end of the smoothing reactor and a positive output terminal of an output end; a second main circuit line which connects a second output terminal of the rectifier circuit and a negative output terminal of the output end; and a smoothing capacitor connected between the first main circuit line and the second main circuit line, in which a first mounting surface of the first main circuit line and a second mounting surface of the second main circuit line are provided on an identical plane, the smoothing capacitor being mounted on the first mounting surface and the second mounting surface, and at least one rectifier element, out of the multiple rectifier elements, is connected to the second mounting surface via the second output terminal.

Advantageous Effects of Invention

According to the present disclosure, the terminals of the smoothing capacitor and the wiring route from the rectifier elements to the smoothing capacitor can be shortened and thereby noise can be suppressed, while the number of parts and the number of mounting processes are reduced. As a result, in the power conversion device according to the present disclosure, the component cost and the mounting cost can be reduced.

BRIEF DESCRIPTION OF DRAWINGS

FIGS. 2A and 2B are plan views of a secondary winding side of the power conversion device according to Embodiment 1.

FIGS. 3A and 3B are top perspective views when the secondary winding side of the power conversion device according to Embodiment 1 is viewed from a smoothing reactor side.

FIGS. 4A and 4B are top perspective views when the secondary winding side of the power conversion device according to Embodiment 1 is viewed from a transformer side.

DESCRIPTION OF EMBODIMENTS

Hereinafter, the embodiments of the present disclosure will be explained in detail with reference to the drawings.

Embodiment 1

A power conversion device according to Embodiment 1 will be explained using FIGS. 1 to 5.

Figure 1:
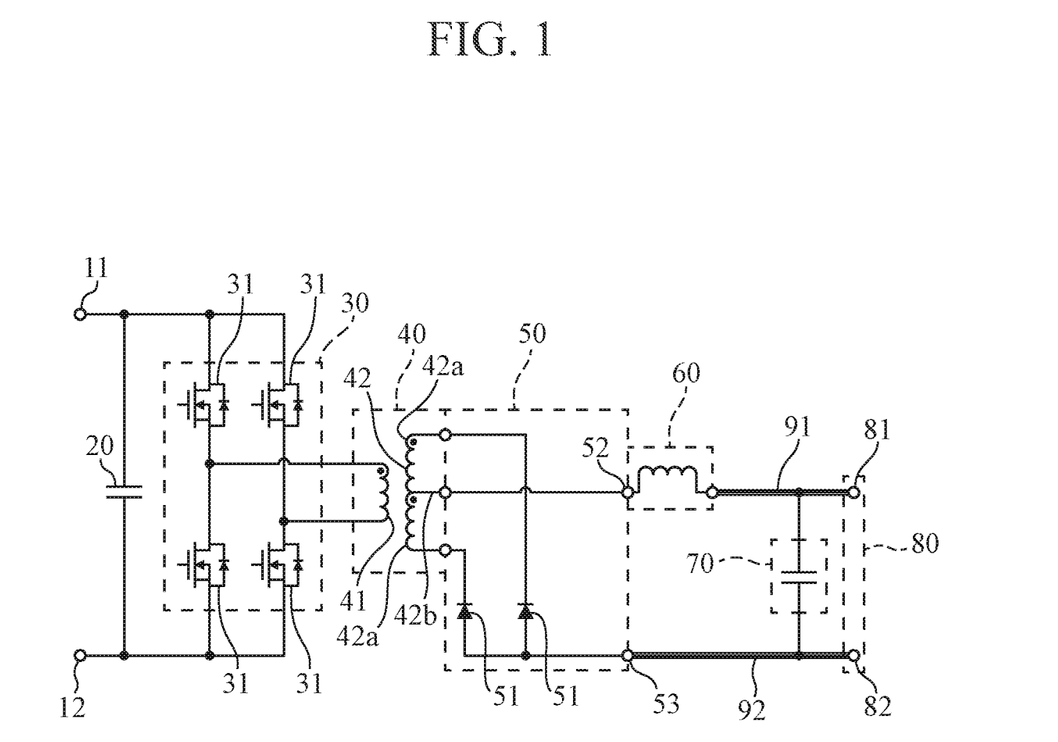
FIG. 1 is a circuit diagram showing the configuration of a power conversion device according to Embodiment 1.

First, FIG. 1 is a circuit diagram showing the configuration of the power conversion device according to Embodiment 1. This power conversion device shown in FIG. 1 is mounted in, for example, an electric vehicle such as an electric car or a hybrid car, and it is assumed that the power conversion device is a DC-DC converter.

As shown in FIG. 1, the power conversion device includes a first input terminal 11, a second input terminal 12, an input capacitor 20, an inverter circuit 30, a transformer 40, a rectifier circuit 50, a smoothing reactor 60, a smoothing capacitor 70, an output end 80, a first main circuit line 91 and a second main circuit line 92.

To the first input terminal 11 and the second input terminal 12, a direct current power supply mounted in an electric vehicle, such as a high voltage battery, is electrically connected. Further, the output end 80 has two output terminals 81 and 82. The polarity of the output terminal 81 is positive while the polarity of the output terminal 82 is negative. To these output terminals 81 and 82, vehicle-mounted equipment mounted in the electric vehicle is electrically connected. The output terminal 81 constitutes a positive output terminal, and the output terminal 82 constitutes a negative output terminal.

The inverter circuit 30 performs power supply to a primary winding 41 of the transformer 40 which will be mentioned later. This inverter circuit 30 has multiple switching elements 31 as primary semiconductor elements. FIG. 1 shows an example in which the inverter circuit 30 has four switching elements 31.

Each switching element 31 is, for example, a self-arc-extinguishing semiconductor switching element such as a metal oxide semiconductor field effect transistor (MOSFET). As an alternative, each switching element 31 may be a wide bandgap semiconductor.

The input capacitor 20 smooths an input voltage from the first input terminal 11 and the second input terminal 12 to the inverter circuit 30. This input capacitor 20 is connected in parallel to the inverter circuit 30.

The transformer 40 has the primary winding 41 and a secondary winding 42. The secondary winding 42 has a structure in which two winding portions 42a are connected in series with each other. First ends of the two winding portions 42a are connected to each other at a center tap portion 42b. The primary winding 41 has a structure of having a single winding portion.

The rectifier circuit 50 rectifies an alternating voltage generated in the secondary winding 42 of the transformer 40. This rectifier circuit 50 has multiple rectifier elements 51 as secondary semiconductor elements, a first output terminal 52, and a second output terminal 53.

The cathode terminals of the rectifier elements 51 are connected to respective second ends of the winding portions 42a. FIG. 1 shows an example in which the rectifier circuit 50 has two rectifier elements 51. The first output terminal 52 is connected to the center tap portion 42b of the transformer 40. The second output terminal 53 is connected to the anode terminals of the rectifier elements 51. At least one rectifier element 51, out of the multiple rectifier elements 51, should just be connected to the output terminal 82 of the output end 80 via the second output terminal 53.

The rectifier elements 51 are, for example, surface mount components. Each rectifier element 51 includes, for example, a single diode. Instead, one rectifier element 51 may include two or more diodes connected in parallel. The rectifier elements 51 may be self-arc-extinguishing semiconductor switching elements such as metal oxide semiconductor field effect transistors (MOSFETs). Instead, the rectifier elements 51 may be wide bandgap semiconductors.

The smoothing reactor 60 smooths the alternating voltage rectified by the rectifier circuit 50. A first end of the smoothing reactor 60 is connected to the first output terminal 52 of the rectifier circuit 50. Further, a second end of the smoothing reactor 60 is connected to the output terminal 81 of the output end 80.

The smoothing capacitor 70 smooths the alternating voltage rectified by the rectifier circuit 50. A first end of the smoothing capacitor 70 is connected to the first main circuit line 91. Further, a second end of the smoothing capacitor 70 is connected to the second main circuit line 92. The smoothing capacitor 70 configured in this way is, for example, a surface mount component such as a laminated ceramic capacitor having a chip shape.

Here, the second end of the smoothing reactor 60 and the output terminal 81 of the output end 80 are connected by the first main circuit line 91. Further, the second output terminal 53 of the rectifier circuit 50 and the output terminal 82 of the output end 80 are connected by the second main circuit line 92.

Therefore, because the power conversion device has the above-mentioned configuration, direct current power having a high voltage is supplied to the first input terminal 11 and the second input terminal 12 from the direct current power supply mounted in the electric vehicle, such as a high voltage battery. This direct current power having a high voltage is temporarily stored in the input capacitor 20. Then, a DC voltage outputted from the input capacitor 20 is converted into an alternating voltage by the switching operations of the switching elements 31 of the inverter circuit 30. Then, the alternating voltage after the conversion by the inverter circuit 30 is supplied to the primary winding 41 of the transformer 40.

Next, the alternating voltage supplied to the primary winding 41 is converted by the transformer 40 into an alternating voltage corresponding to the turn ratio of the primary winding 41 to the secondary winding 42. The alternating voltage generated in the secondary winding 42 is then rectified by the rectifier elements 51 of the rectifier circuit 50 into a pulsating voltage. Next, the pulsating voltage after the rectification by the rectifier circuit 50 is smoothed by the smoothing reactor 60 and the smoothing capacitor 70. Then, the direct current power smoothed by the smoothing reactor 60 and the smoothing capacitor 70 is outputted to the vehicle-mounted equipment mounted in the electric vehicle via the output terminals 81 and 82 of the output end 80.

Next, a concrete configuration of a secondary winding 42 side of the power conversion device according to Embodiment 1 will be explained using FIGS. 2 to 5.

Figure 2A:
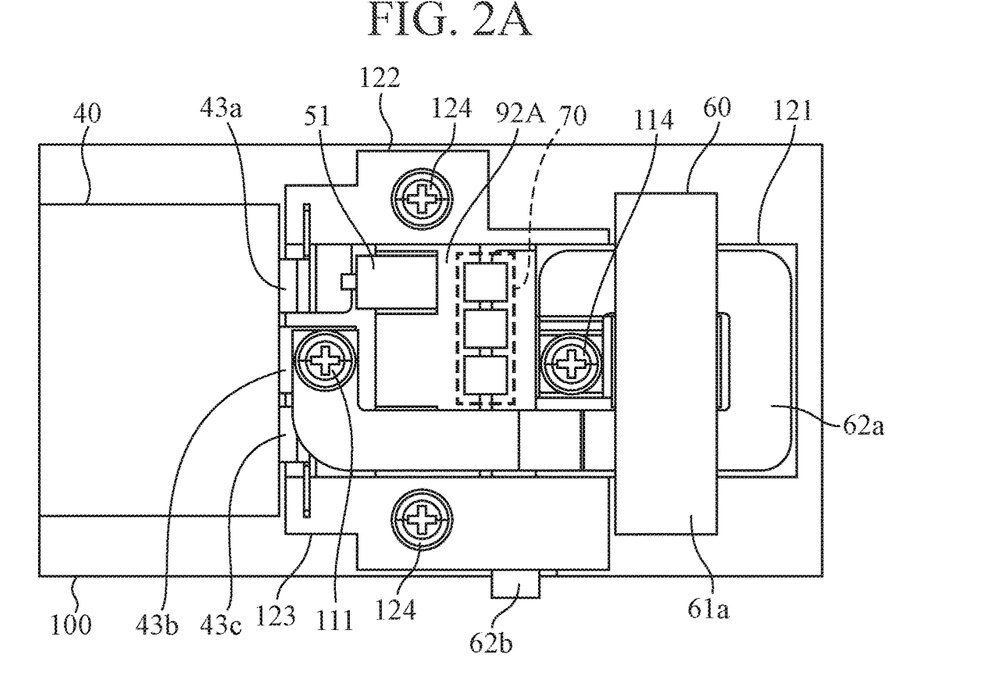
FIG. 2A is a view showing a state in which resin members are attached to the power conversion device.
Figure 2B:
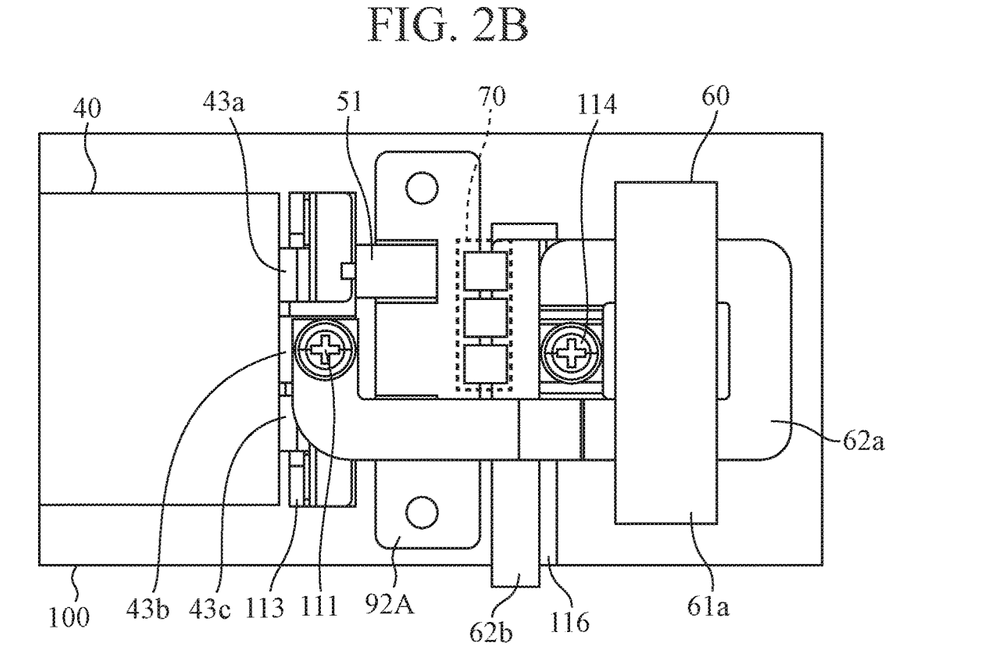
FIG. 2B is a view showing a state where the resin members are removed from the power conversion device.
Figure 3A:
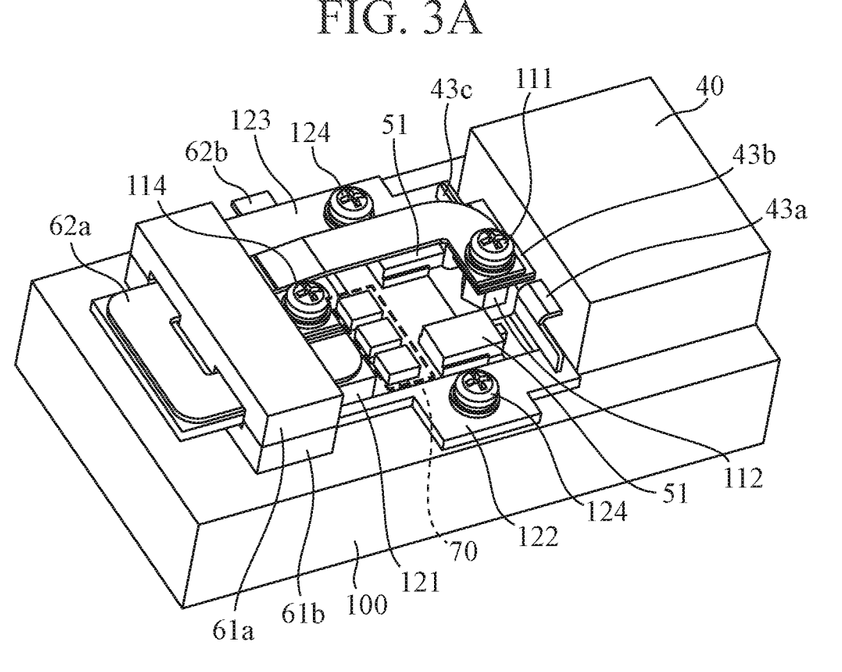
FIG. 3A is a view showing the state in which the resin members are attached to the power conversion device.
Figure 3B:
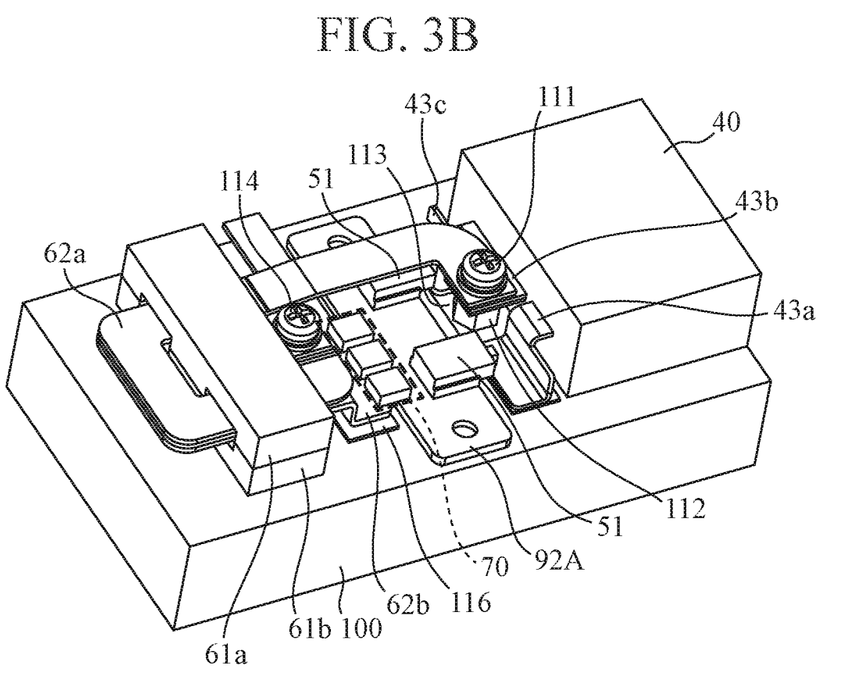
FIG. 3B is a view showing the state in which the resin members are removed from the power conversion device.
Figure 4A:
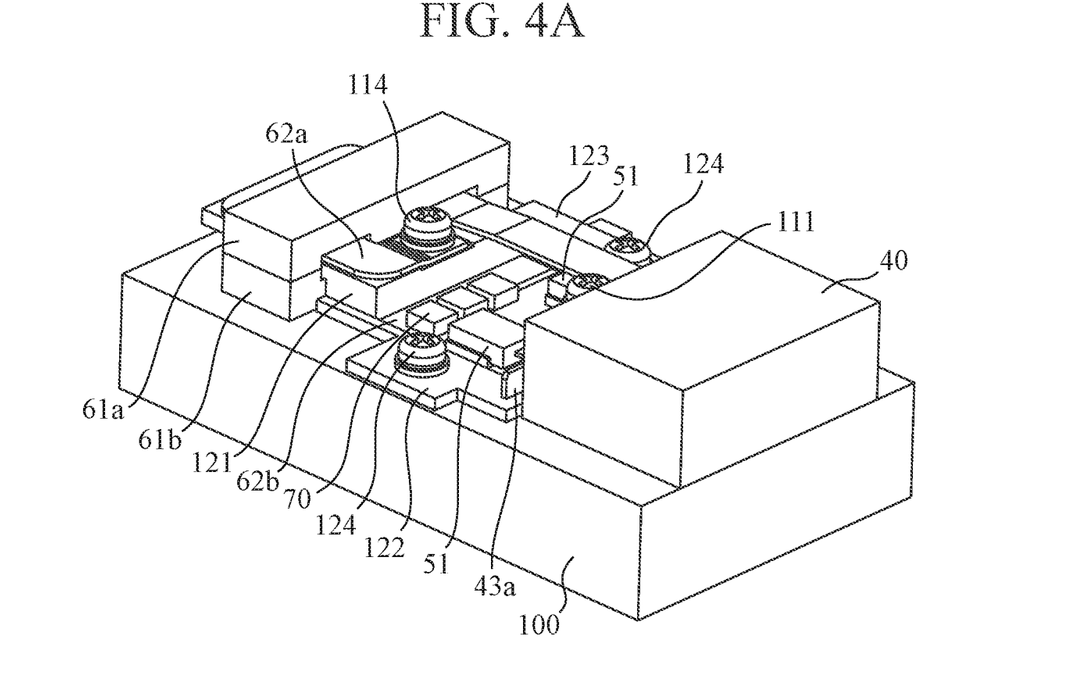
FIG. 4A is a view showing the state in which the resin members are attached to the power conversion device.
Figure 4B:
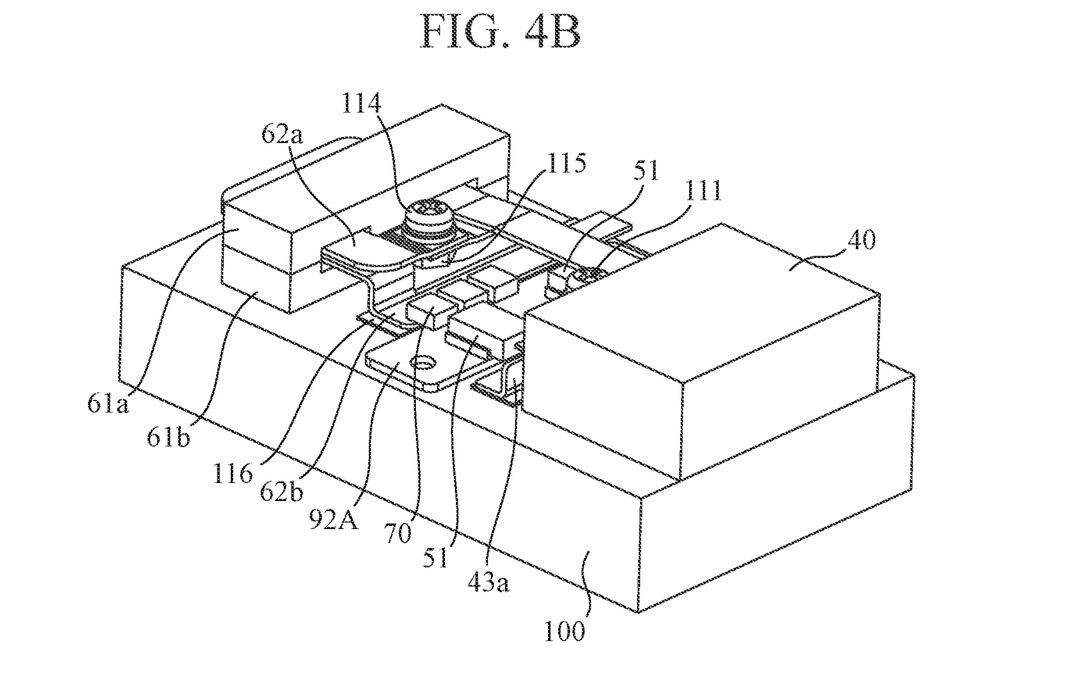
FIG. 4B is a view showing the state in which the resin members are removed from the power conversion device.
Figure 5:
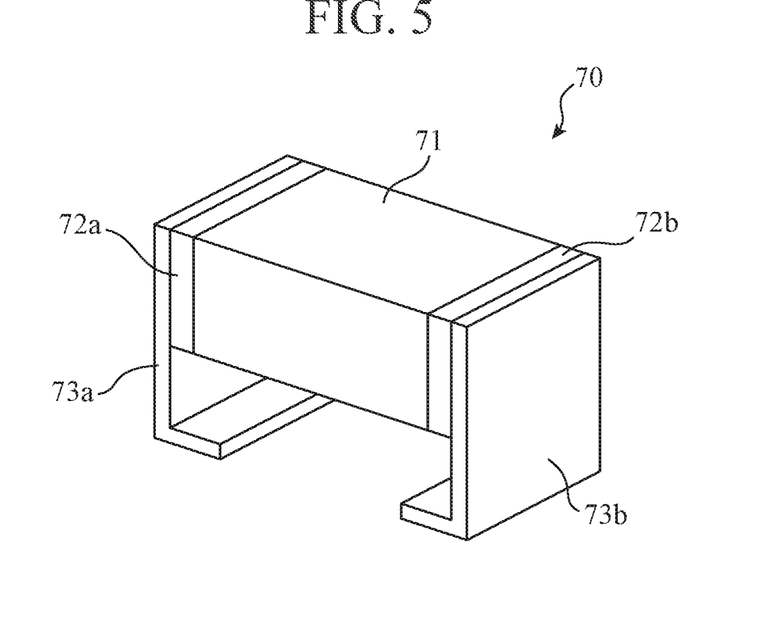
FIG. 5 is an external perspective view of a smoothing capacitor.

FIG. 2 includes plan views showing the secondary winding 42 side of the power conversion device according to Embodiment 1. FIG. 3 includes top perspective views when the secondary winding 42 side of the power conversion device according to Embodiment 1 is viewed from a smoothing reactor 60 side. FIG. 4 includes top perspective views when the secondary winding 42 side of the power conversion device according to Embodiment 1 is viewed from a transformer 40 side. FIG. 5 is an external perspective view of an example of the smoothing capacitor 70.

In the power conversion device, its configuration can be divided by the transformer 40 into the configuration on a primary winding 41 side and the configuration on the secondary winding 42 side. More specifically, as shown in FIG. 1, the first input terminal 11, the second input terminal 12, the input capacitor 20, the inverter circuit 30 and the primary winding 41 of the transformer 40 constitute the primary winding 41 side of the power conversion device. Further, the secondary winding 42 of the transformer 40, the rectifier circuit 50, the smoothing reactor 60, the smoothing capacitor 70, the output end 80, the first main circuit line 91 and the second main circuit line 92 constitute the secondary winding 42 side of the power conversion device.

The power conversion device shown in FIGS. 2 to 4 includes a cooler 100. This cooler 100 is disposed in a lower part of the power conversion device, and constitutes a base of the power conversion device. The cooler 100 cools the input capacitor 20, the inverter circuit 30, the transformer 40, the rectifier circuit 50, the smoothing reactor 60 and the smoothing capacitor 70. The cooler 100 has, for example, a channel through which cooling water flows. The cooler 100 should just cool at least one of the inverter circuit 30, the transformer 40, the rectifier circuit 50 and the smoothing reactor 60.

As shown in FIGS. 2 to 4, on both sides of an upper surface of the cooler 100, the transformer 40 and the smoothing reactor 60 are mounted opposite to each other.

The smoothing reactor 60 has cores 61a and 61b and windings 62a and 62b. The cores 61a and 61b are, for example, EE type cores formed of a ferrite material. Further, the windings 62a and 62b are, for example, flat-shaped, and are stamped from a flat-shaped sheet of metal through a stamping process.

The core 61b located on a lower side is disposed on the upper surface of the cooler 100, and the core 61a located on an upper side is disposed on an upper surface of the core 61b. The cores 61a and 61b are made to butt against each other in the vertical direction.

The winding 62a is placed above the winding 62b. The winding 62a located on an upper side and the winding 62b located on a lower side are disposed in such a way as to be sandwiched between the cores 61a and 61b from above and below in the vertical direction. The windings 62a and 62b are wound inside the cores 61a and 61b which are made to butt against each other. The winding 62b is wound inside the cores 61a and 61b and directly under the winding 62a.

A first end of the winding 62a is pulled out from the cores 61a and 61b toward the transformer 40. Further, a second end of the winding 62a is pulled out from the cores 61a and 61b to a space near the cores 61a and 61b. On the other hand, a first end of the winding 62b is pulled out from the cores 61a and 61b to the space near the cores 61a and 61b, and is placed below the second end of the winding 62a. Further, a second end of the winding 62b is pulled out from the cores 61a and 61b to the below-mentioned smoothing capacitor 70. Then, the second end of the winding 62a and the first end of the winding 62b are connected to each other using a screw 114 and a nut 115.

Here, the winding 62a functions as both a line to connect the center tap portion 42b of the transformer 40 and the first end of the smoothing reactor 60, and the first turn of the windings of the smoothing reactor 60 (refer to FIG. 1). Further, the winding 62b functions as both the second turn of the windings of the smoothing reactor 60, and the first main circuit line 91 (refer to FIG. 1).

An upper surface of the winding 62b is one on which the smoothing capacitor 70 is mounted by means of soldering, and constitutes a first mounting surface. A lower surface of the winding 62b is located opposite to the upper surface, and constitutes a first back surface.

A bus bar 92A is disposed between the transformer 40 and the smoothing reactor 60. This bus bar 92A functions as the second main circuit line 92. Further, an upper surface of the bus bar 92A is one on which the rectifier elements 51 and the smoothing capacitor 70 are mounted by means of soldering, and constitutes a second mounting surface. A lower surface of the bus bar 92A is located opposite to the upper surface, and constitutes a second back surface.

The lower surface of the bus bar 92A is disposed on the upper surface of the cooler 100. Therefore, the lower surface of the bus bar 92A is connected electrically and thermally to the upper surface of the cooler 100. At this time, the upper surface of the winding 62b and the upper surface of the bus bar 92A are placed at the same level. More specifically, the upper surface of the winding 62b and the upper surface of the bus bar 92A are placed on an identical plane.

Further, the transformer 40 has transformer terminals 43a to 43c which serve as terminals of the secondary winding 42 (refer to FIG. 1). The transformer terminals 43a and 43b are formed in such a way as to project from the transformer 40 toward the smoothing reactor 60.

The transformer terminal 43b located in the middle of the transformer terminals 43a to 43c constitutes the center tap portion 42b (refer to FIG. 1). To this transformer terminal 43b, the first end of the winding 62a is connected using a screw 111 and a nut 112. The first end of the winding 62a is pressed against the nut 112 from above by the screw 111. The nut 112 is disposed on the upper surface of the cooler 100 via an insulation sheet 113. Therefore, the winding 62a is thermally connected to the cooler 100 while being electrically insulated from the cooler 100.

Each of upper surfaces of the transformer terminals 43a and 43c located at both ends of the transformer terminals 43a to 43c, and the upper surface of the bus bar 92A are placed at the same level. More specifically, the upper surfaces of the transformer terminals 43a and 43c and the upper surface of the bus bar 92A are placed on an identical plane. Lower surfaces of the transformer terminals 43a and 43c are disposed on the upper surface of the cooler 100 via the insulation sheet 113. Therefore, the lower surfaces of the transformer terminals 43a and 43c are thermally connected to the upper surface of the cooler 100 while being electrically insulated from the upper surface of the cooler 100.

The upper surfaces of the transformer terminals 43a and 43c are the ones on which the rectifier elements 51 are mounted by means of soldering, and constitute a third mounting surface. The lower surfaces of the transformer terminals 43a and 43c constitute a third back surface located opposite to the upper surfaces.

The rectifier elements 51 are mounted by means of soldering on the upper surfaces of the transformer terminals 43a and 43c and on the upper surface of the bus bar 92A in such a way as to extend over each of the upper surfaces of the transformer terminals 43a and 43c and the upper surface of the bus bar 92A.

The upper surface of the winding 62b and the upper surface of the bus bar 92A are placed at the same level. More specifically, the upper surface of the winding 62b and the upper surface of the bus bar 92A are placed on an identical plane. Further, the lower surface of the winding 62b is disposed on the upper surface of the cooler 100 via an insulation sheet 116. Therefore, the winding 62b is connected thermally to the cooler 100 while being electrically insulated from the cooler 100.

The smoothing capacitor 70 is mounted by means of soldering on the upper surface of the winding 62b and on the upper surface of the bus bar 92A in such a way as to extend over the upper surface of the winding 62b and the upper surface of the bus bar 92A.

As shown in FIGS. 2A, 3A and 4A, the power conversion device includes resin members 121 to 123. These resin members 121 to 123 insulate the winding 62b and the bus bar 92A from each other, and integrate the winding 62b and the bus bar 92A.

The resin member 121 is formed in such a way as to hold the second end of the winding 62a, the first end of the winding 62b and the nut 115. Therefore, the second end of the winding 62a, the first end of the winding 62b and the nut 115 are fixed to one another.

The resin member 122 is formed in such a way as to hold the second end of the winding 62b, a first end of the bus bar 92A and the transformer terminal 43a. Therefore, the second end of the winding 62b, the first end of the bus bar 92A and the transformer terminal 43a are fixed to one another. Further, the resin member 122 is fixed to the upper surface of the cooler 100 using a screw 124.

The resin member 123 is formed in such a way as to hold the second end of the winding 62b, a second end of the bus bar 92A and the transformer terminal 43c. Therefore, the second end of the winding 62b, the second end of the bus bar 92A and the transformer terminal 43c are fixed to one another. Further, the resin member 123 is fixed to the upper surface of the cooler 100 using a screw 124.

Therefore, because in the power conversion device, the upper surface of the winding 62b, the upper surface of the bus bar 92A and the upper surfaces of the transformer terminals 43a and 43b are placed on an identical plane, it is possible to mount the rectifier elements 51 and the smoothing capacitor 70 on an identical plane. Therefore, the wiring route from the rectifier elements 51 to the smoothing capacitor 70 is shortened.

The current flowing through the wiring route is blocked every time when either the switching elements 31 of the inverter circuit 30 or the rectifier elements 51 of the rectifier circuit 50 perform switching operations. At the time of this block of the current, a steep voltage is generated by parasitic inductance, and noise also occurs because of this generated voltage.

As to this, by shortening the above-mentioned wiring route of the power conversion device, the parasitic inductance largely depending on the length of the wiring route can be reduced, and thereby the noise at the output end 80 can be suppressed. Further, the power conversion device does not need additional members, such as a substrate and terminals, in order to reduce the parasitic inductance. In addition, because the number of mounting processes of the power conversion device can also be reduced to only one at the time of mounting the smoothing capacitor 70, the manufacturing cost can be reduced.

Because the rectifier elements 51 of the rectifier circuit 50 are surface mount components, the loop path through which a secondary current flows in the rectifier circuit 50 is shortened. Therefore, the parasitic inductance in the rectifier circuit 50 is reduced. Further, because the upper surfaces of the transformer terminals 43a and 43c and the upper surface of the bus bar 92A are placed at the same level, the mounting of the rectifier elements 51 is performed easily. At this time, in the case where both the rectifier elements 51 and the smoothing capacitor 70 are surface mount components in the power conversion device, commonality can be achieved between processes of mounting the rectifier elements and the smoothing capacitor.

The winding 62b of the smoothing reactor 60, the winding having the function of the first main circuit line 91, and the bus bar 92A having the function of the second main circuit line 92 are thermally connected to the cooler 100. Because the transformer 40 and the smoothing reactor 60 can be sufficiently cooled in the power conversion device, the size of the transformer 40 can be reduced, the width of the winding of the smoothing reactor 60 can be narrowed and the thickness of the winding can be thinned.

In the case of mounting the smoothing reactor 60 on the flat upper surface of the cooler 100, it is more advantageous in terms of cooling to make the smoothing reactor 60 be of planar type. Further, in the smoothing reactor 60, the height position of the upper surface of the winding 62b is determined by the thickness of the core 61b. Therefore, usually, the height position of the upper surface of the winding 62b does not match the height position of the upper surface of the bus bar 92A in many cases.

As to this, in the smoothing reactor 60, the winding 62b is bent in such a way that the upper surface of the winding 62b, the upper surfaces of the transformer terminals 43a and 43c and the upper surface of the bus bar 92A are placed on an identical plane, and it is possible to adjust the height position of the winding 62b. Therefore, even though the smoothing reactor 60 is of planar type, the smoothing capacitor 70 can be mounted directly on each of the upper surfaces of the winding 62b and the bus bar 92A while extending over the upper surfaces of the winding 62b and the bus bar 92A.

In the power conversion device, at least one of the switching element 31 of the inverter circuit 30 and the rectifier element 51 of the rectifier circuit 50 may be a wide bandgap semiconductor, such as a silicon carbide (SiC) semiconductor and a gallium nitride (GaN) semiconductor. In the case where the switching elements 31 and the rectifier elements 51 are wide bandgap semiconductors in this way, noise in a high frequency band increases because [di/dt] of each of the switching and rectifier elements 31 and 51 becomes large.

As to this, the attenuation characteristic of attenuating the noise in the high frequency band can be improved in the power conversion device by reducing the parasitic inductance. Therefore, in the power conversion device, the noise at the output end 80 can be suppressed even in the case where the switching elements 31 and the rectifier elements 51 are wide bandgap semiconductors.

Further, because DC-DC converters for vehicles are used under an environment where a temperature change between a high temperature and a low temperature is repeated, there is a case in which a thermal stress is applied to a solder joint of a capacitor because of the thermal expansion coefficient difference between a copper plate and a resin, and thereby a crack occurs in the solder. As a measure against this crack, a laminated ceramic capacitor with metal terminals as shown in FIG. 5 may be used as the smoothing capacitor 70. The laminated ceramic capacitor with metal terminals has a dielectric 71 serving as a capacitor body, metallic external terminals 72a and 72b and metal terminals 73a and 73b.

The dielectric 71 is the one in which ceramic materials are layered. The external terminals 72a and 72b are disposed at both ends of the dielectric 71. The metal terminal 73a is disposed on an outer surface of the external terminal 72a, and can be connected to, for example, the first main circuit line 91. Further, the metal terminal 73b is disposed on an outer surface of the external terminal 72b, and can be connected to, for example, the second main circuit line 92. Such metal terminals 73a and 73b are formed using, for example, sheet metal processing. Further, the metal terminals 73a and 73b are electrically connected to the external terminals 72a and 72b by means of soldering.

The use of such a laminated ceramic capacitor with metal terminals makes it possible to absorb the thermal stress in the metal terminals 73a and 73b and thereby prevent a crack from occurring in the solder. Further, it is assumed that the laminated ceramic capacitor with metal terminals shown in FIG. 5 is surface-mounted. Therefore, the length of each of the metal terminals 73a and 73b is as short as approximately 1 to 2 mm from a bottom surface of the dielectric 71, and thus their parasitic inductances are very low.

As mentioned above, the power conversion device according to Embodiment 1 includes: the transformer 40 having the primary winding 41 and the secondary winding 42, power supply to the primary winding 41 by the inverter circuit 30 being to be performed; the rectifier circuit 50 to rectify the alternating voltage generated in the secondary winding 42 with the multiple rectifier elements 51; the smoothing reactor 60 whose first end is connected to the first output terminal 52 of the rectifier circuit 50, to smooth the voltage rectified by the rectifier circuit 50; the first main circuit line 91 which connects the second end of the smoothing reactor 60 and the output terminal 81 of the output end 80; the second main circuit line 92 which connects the second output terminal 53 of the rectifier circuit 50 and the output terminal 82 of the output end 80; and the smoothing capacitor 70 connected between the first main circuit line 91 and the second main circuit line 92. The upper surface of the first main circuit line 91 on which the smoothing capacitor 70 is mounted and the upper surface of the second main circuit line 92 on which the smoothing capacitor 70 is mounted are provided on an identical plane. At least one rectifier element 51, out of the multiple rectifier elements 51, is connected to the upper surface of the second main circuit line 92 via the second output terminal 53. Therefore, in the power conversion device, the terminals of the smoothing capacitor 70 and the wiring route from the rectifier elements 51 to the smoothing capacitor 70 can be shortened and thereby noise can be suppressed, while the number of parts and the number of mounting processes are reduced. As a result, in the power conversion device according to the present disclosure, the component cost and the mounting cost can be reduced.

The power conversion device includes the resin members 121 and 122 which insulate the winding 62b having the function of the first main circuit line 91 from the bus bar 92A having the function of the second main circuit line 92, and integrate the winding 62b and the bus bar 92A. Therefore, in the power conversion device, the winding 62b and the bus bar 92A can be easily fixed. Further, because the installation spacing between the winding 62b and the bus bar 92A is kept constant, the smoothing capacitor 70 can be easily mounted in the power conversion device.

In the power conversion device, the upper surfaces of the transformer terminals 43a and 43b on which the rectifier elements 51 are mounted, and the upper surface of the bus bar 92A are provided on an identical plane. Therefore, in the power conversion device, the rectifier elements 51 can be easily mounted on each of the upper surfaces.

The power conversion device includes the cooler 100 to cool at least one of the inverter circuit 30, the transformer 40, the rectifier circuit 50 and the smoothing reactor 60. At least one surface out of the lower surface located opposite to the upper surface of the winding 62b and the lower surface located opposite to the upper surface of the bus bar 92A is thermally connected to the cooler 100. Therefore, in the power conversion device, either the winding 62b or the bus bar 92A can be cooled.

In the power conversion device, the winding 62a of the smoothing reactor 60 constitutes the first main circuit line 91. Therefore, in the power conversion device, the first main circuit line 91 can be easily disposed.

In the power conversion device, the winding 62b having the function of the first main circuit line 91 is provided between the multiple rectifier elements 51 and the cores 61a and 61b when viewed from a direction perpendicular to the upper surface of the winding 62b or the upper surface of the bus bar 92A. Therefore, because in the power conversion device, the smoothing capacitor 70 can be placed very close to the rectifier elements 51, the wiring route from the rectifier elements 51 to the smoothing capacitor 70 can be shortened.

The multiple rectifier elements 51 and the smoothing capacitor 70 are provided between the transformer 40 and the smoothing reactor 60 when viewed from the direction perpendicular to the upper surface of the winding 62b or the upper surface of the bus bar 92A. Therefore, the downsizing of the power conversion device can be achieved while the wiring route from the rectifier elements 51 to the smoothing capacitor 70 is shortened.

In the power conversion device, the smoothing capacitor 70 is a surface mount type element having a small parasitic inductance. In the power conversion device, the use of the smoothing capacitor 70 which is a surface mount type element shortens the terminals of the smoothing capacitor 70 as much as possible, thereby being able to reduce the parasitic inductance. As a result, in the power conversion device, noise can be suppressed.

In the power conversion device, the smoothing capacitor 70 includes: the dielectric 71 in which ceramic materials are layered; the external terminals 72a and 72b each provided at a corresponding one of both the ends of the dielectric 71; and the metal terminals 73a and 73b provided, respectively, on the outer surfaces of the external terminals 72a and 72b. Therefore, the smoothing capacitor 70 can have resistance to thermal shock while suppressing an increase in the parasitic inductance of each of the terminals.

In the power conversion device, each of the multiple rectifier elements 51 is a surface mount type element having a small parasitic inductance. Therefore, in the power conversion device, noise can be suppressed by reducing the parasitic inductance in the rectifier circuit 50.

In the power conversion device, each of the multiple rectifier elements 51 is a wide bandgap semiconductor. In the case where the rectifier elements 51 are wide bandgap semiconductors, although noise in a high frequency band is increased, the attenuation characteristic of attenuating the noise in the high frequency band can be improved in the power conversion device by reducing the parasitic inductance.

In the power conversion device, the smoothing reactor 60 is of planar type. Therefore, in the case where the smoothing reactor 60 is mounted on the flat upper surface of the cooler 100, the smoothing reactor 60 can be cooled effectively in the power conversion device.

Embodiment 2

A power conversion device according to Embodiment 2 will be explained using FIG. 6. Components having the same functions as those of components explained in above-mentioned Embodiment 1 are denoted by the same reference signs, and an explanation of the components will be omitted hereinafter.

Figure 6:
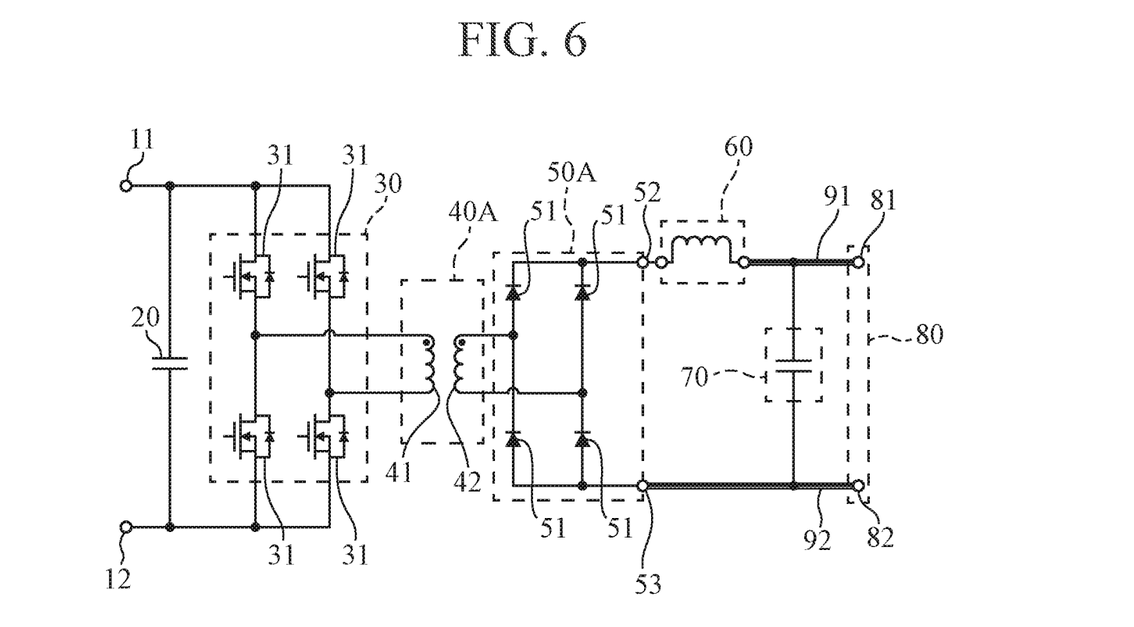
FIG. 6 is a circuit diagram showing the configuration of a power conversion device according to Embodiment 2.

As shown in FIG. 6, the power conversion device according to Embodiment 2 includes a transformer 40A and a rectifier circuit 50A instead of the transformer 40 and the rectifier circuit 50 of the power conversion device according to Embodiment 1.

The transformer 40A has a primary winding 41 and a secondary winding 42. Each of the primary and secondary windings 41 and 42 includes a single winding portion. Therefore, the secondary winding 42 does not have the center tap portion 42b.

The rectifier circuit 50A is a bridge circuit having four rectifier elements 51. The cathode terminals of the rectifier elements 51 are connected to a first end of a smoothing reactor 60 via a first output terminal 52. Further, the anode terminals of the rectifier elements 51 are connected to a second output terminal 53.

As mentioned above, the power conversion device according to Embodiment 2 includes: the transformer 40A having the primary winding 41 and the secondary winding 42, power supply to the primary winding 41 by an inverter circuit 30 being to be performed; the rectifier circuit 50A to rectify the alternating voltage generated in the secondary winding 42 with the multiple rectifier elements 51; the smoothing reactor 60 whose first end is connected to the first output terminal 52 of the rectifier circuit 50A, to smooth the voltage rectified by the rectifier circuit 50A; a first main circuit line 91 which connects a second end of the smoothing reactor 60 and an output terminal 81 of an output end 80; a second main circuit line 92 which connects the second output terminal 53 of the rectifier circuit 50 and an output terminal 82 of the output end 80; and a smoothing capacitor 70 connected between the first main circuit line 91 and the second main circuit line 92. An upper surface of the first main circuit line 91 on which the smoothing capacitor 70 is mounted and an upper surface of the second main circuit line 92 on which the smoothing capacitor 70 is mounted are provided on an identical plane. At least one rectifier element 51, out of the multiple rectifier elements 51, is connected to the upper surface of the second main circuit line 92 via the second output terminal 53. Therefore, in the power conversion device, the terminals of the smoothing capacitor 70 and the wiring route from the rectifier elements 51 to the smoothing capacitor 70 can be shortened and thereby noise can be suppressed, while the number of parts and the number of mounting processes are reduced. As a result, in the power conversion device according to the present disclosure, the component cost and the mounting cost can be reduced.

It is to be understood that a free combination of the above-mentioned embodiments can be made, various changes can be made in any component in each of the above-mentioned embodiments, or any component in each of the above-mentioned embodiments can be omitted within the scope of the present disclosure.

REFERENCE SIGNS LIST 11 first input terminal, 12 second input terminal, 20 input capacitor, 30 inverter circuit, 31 switching element, 40, 40A transformer, 41 primary winding, 42 secondary winding, 42a winding portion, 42b center tap portion, 43a to 43c transformer terminal, 50, 50A rectifier circuit, 51 rectifier element, 52 first output terminal, 53 second output terminal, 60 smoothing reactor, 61a, 61b core, 62a, 62b winding, 70 smoothing capacitor, 71 dielectric, 72a, 72b external terminal, 73a, 73b metal terminal, 80 output end, 81 output terminal, 82 output terminal, 91 first main circuit line, 92 second main circuit line, 92A bus bar, 100 cooler, 111 screw, 112 nut, 113 insulation sheet, 114 screw, 115 nut, 116 insulation sheet, 121 to 123 resin member, and 124 screw.

What is claimed is:

1. A power conversion device comprising:
   a transformer having a primary winding and a secondary winding;
   an inverter circuit to provide power supply to the primary winding;
   a rectifier circuit to rectify alternating voltage generated in the secondary winding with multiple rectifier elements;
   a smoothing reactor whose first end is connected to a first output terminal of the rectifier circuit, to smooth the voltage rectified by the rectifier circuit;
   a first main circuit line which connects a second end of the smoothing reactor and a positive output terminal of an output end;
   a second main circuit line which connects a second output terminal of the rectifier circuit and a negative output terminal of the output end; and
   a smoothing capacitor connected between the first main circuit line and the second main circuit line,
   wherein a first mounting surface of the first main circuit line and a second mounting surface of the second main circuit line are provided on an identical plane, the smoothing capacitor being mounted on the first mounting surface and the second mounting surface, and
   at least one rectifier element, out of the multiple rectifier elements, is connected to the second mounting surface via the second output terminal.

2. The power conversion device according to claim 1, further comprising a resin member which insulates the first main circuit line from the second main circuit line, and integrates the first main circuit line and the second main circuit line.

3. The power conversion device according to claim 1, wherein a third mounting surface of the transformer and the second mounting surface are provided on the identical plane, the rectifier elements being mounted on the third mounting surface.

4. The power conversion device according to claim 1, further comprising:
   a cooler to cool at least one of the inverter circuit, the transformer, the rectifier circuit and the smoothing reactor,
   wherein at least one of a first back surface of the first main circuit line, the first back surface being opposite to the first mounting surface, and a second back surface of the second main circuit line, the second back surface being opposite to the second mounting surface, is thermally connected to the cooler.

5. The power conversion device according to claim 1, wherein a winding of the smoothing reactor constitutes the first main circuit line.

6. The power conversion device according to claim 1, wherein the first main circuit line is provided between the smoothing reactor and the multiple rectifier elements when viewed from a direction perpendicular to the first mounting surface or the second mounting surface.

7. The power conversion device according to claim 1, wherein the multiple rectifier elements and the smoothing capacitor are provided between the transformer and the smoothing reactor when viewed from a direction perpendicular to the first mounting surface or the second mounting surface.

8. The power conversion device according to claim 1, wherein the smoothing capacitor is a surface mount type element.

9. The power conversion device according to claim 8, wherein the smoothing capacitor includes: a dielectric in which ceramic materials are layered; external terminals each provided at a corresponding one of both ends of the dielectric; and metal terminals each provided on a corresponding one of outer surfaces of the respective external terminals.

10. The power conversion device according to claim 1, wherein each of the multiple rectifier elements is a surface mount type element.

11. The power conversion device according to claim 1, wherein each of the multiple rectifier elements is a wide bandgap semiconductor.

12. The power conversion device according to claim 1, wherein the smoothing reactor is of planar type.

* * * * *